(12) United States Patent
Olczak et al.

(10) Patent No.: US 9,672,729 B2
(45) Date of Patent: Jun. 6, 2017

(54) RELEVANCE DETERMINATION OF SENSOR EVENT

(71) Applicant: HALTIAN OY, Oulu (FI)

(72) Inventors: Michal Olczak, Oulu (FI); Heini Tuorila, Oulu (FI); Ville-Hermanni Yllasjarvi, Ii (FI); Jyrki Okkonen, Oulu (FI)

(73) Assignee: HALTIAN OY, Oulu (FI)

( * ) Notice: Subject to any disclaimer, the term of this patent is extended or adjusted under 35 U.S.C. 154(b) by 193 days.

(21) Appl. No.: 14/605,558

(22) Filed: Jan. 26, 2015

(65) Prior Publication Data

US 2015/0262474 A1 Sep. 17, 2015

(30) Foreign Application Priority Data

Mar. 12, 2014 (EP) .................................... 14159104

(51) Int. Cl.
| | | |
|---|---|---|
| *G06F 13/38* | (2006.01) | |
| *G06Q 10/08* | (2012.01) | |
| *G08G 1/00* | (2006.01) | |
| *G08B 29/18* | (2006.01) | |

(52) U.S. Cl.
CPC ......... *G08B 29/185* (2013.01); *G06F 13/385* (2013.01); *G06Q 10/0833* (2013.01); *G08G 1/207* (2013.01)

(58) Field of Classification Search
CPC ......... G06F 17/30064; G06F 17/30876; G06F 19/3418; G06F 21/00; G06F 21/50; G06F 21/552; H04L 12/1845; H04L 12/1895; H04L 43/08; H04L 51/20; H04L 51/26; H04L 51/32; H04L 63/306; H04W 4/02
See application file for complete search history.

(56) References Cited

U.S. PATENT DOCUMENTS

| | | | |
|---|---|---|---|
| 8,639,767 B1 * | 1/2014 | Harris | G06Q 50/01 709/202 |
| 2004/0196182 A1 | 10/2004 | Unnold | |
| 2005/0222895 A1 | 10/2005 | Jakobson et al. | |
| 2006/0164231 A1 | 7/2006 | Salisbury et al. | |
| 2006/0212570 A1 | 9/2006 | Aritsuka et al. | |
| 2006/0218191 A1 * | 9/2006 | Gopalakrishnan .. | G06F 17/3002 |
| 2007/0115101 A1 * | 5/2007 | Creekbaum | B60R 25/00 340/426.22 |
| 2007/0118332 A1 | 5/2007 | Meyers et al. | |
| 2008/0221776 A1 * | 9/2008 | McClellan | B60R 16/0236 701/103 |

(Continued)

FOREIGN PATENT DOCUMENTS

WO 2010/091217 A2 8/2010

OTHER PUBLICATIONS

Communication dated Jul. 29, 2014 from the European Patent Office in counterpart application No. 14159104.0.

*Primary Examiner* — Fekadeselassie Girma
(74) *Attorney, Agent, or Firm* — Sughrue Mion, PLLC

(57) ABSTRACT

Relevance determination of sensor event is disclosed. An apparatus obtains a sensor event created on the basis of sensor data generated by one or more sensors, determines relevance of the sensor event, and if the relevance of the sensor event fulfills a predetermined relevance condition, outputs, with the output interface, the sensor event according to its determined relevance.

1 Claim, 5 Drawing Sheets

(56) References Cited

U.S. PATENT DOCUMENTS

| | | | |
|---|---|---|---|
| 2009/0299622 A1* | 12/2009 | Denaro | G01C 21/32 |
| | | | 701/533 |
| 2010/0102122 A1* | 4/2010 | Skowronek | G06Q 20/32 |
| | | | 235/380 |
| 2010/0289669 A1 | 11/2010 | Saltzman et al. | |
| 2011/0106345 A1* | 5/2011 | Takacs | G05D 1/0676 |
| | | | 701/17 |
| 2012/0137367 A1* | 5/2012 | Dupont | G06F 21/00 |
| | | | 726/25 |
| 2012/0176235 A1* | 7/2012 | Bantz | G08G 1/096741 |
| | | | 340/459 |
| 2012/0242472 A1 | 9/2012 | Walsh et al. | |
| 2013/0184007 A1* | 7/2013 | Hategan | G06Q 30/0259 |
| | | | 455/456.1 |
| 2013/0196614 A1* | 8/2013 | Pahlevani | H04W 4/22 |
| | | | 455/404.2 |
| 2014/0379205 A1* | 12/2014 | Muetzel | G07C 5/00 |
| | | | 701/32.4 |
| 2015/0066362 A1* | 3/2015 | Meyer | G06Q 30/0645 |
| | | | 701/468 |
| 2015/0070175 A1* | 3/2015 | Hey | G08B 21/0297 |
| | | | 340/573.1 |
| 2015/0149018 A1* | 5/2015 | Attard | G05D 1/0061 |
| | | | 701/23 |
| 2015/0269842 A1* | 9/2015 | Ignaczak | B60W 10/06 |
| | | | 701/118 |
| 2015/0291145 A1* | 10/2015 | Yu | B60W 10/06 |
| | | | 701/22 |

* cited by examiner

RELEVANCE DETERMINATION OF SENSOR EVENT

FIELD

The invention relates to an apparatus determining relevance of a sensor event.

BACKGROUND

Internet of Things and Ubiquitous Computing are among the concepts including numerous sensors producing vast amounts of measurement data. Instead of lack of information, proliferation of information becomes the problem. More specifically, how to determine the relevance of sensor events is the problem to be solved.

BRIEF DESCRIPTION

The present invention seeks to provide an improved apparatus.

According to an aspect of the present invention, there is provided an apparatus comprising: an output interface; one or more processors; and one or more memories including computer program code, the one or more memories and the computer program code configured to, with the one or more processors, cause the apparatus at least to: obtain a sensor event created on the basis of sensor data generated by one or more sensors; determine relevance of the sensor event; and if the relevance of the sensor event fulfils a predetermined relevance condition, output, with the output interface, the sensor event according to its determined relevance.

LIST OF DRAWINGS

Example embodiments of the present invention are described below, by way of example only, with reference to the accompanying drawings, in which FIG. 1 illustrates example embodiments of an apparatus;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses have been depicted as separate single entities, different parts may be implemented in one or more physical or logical entities.

Figure 1:
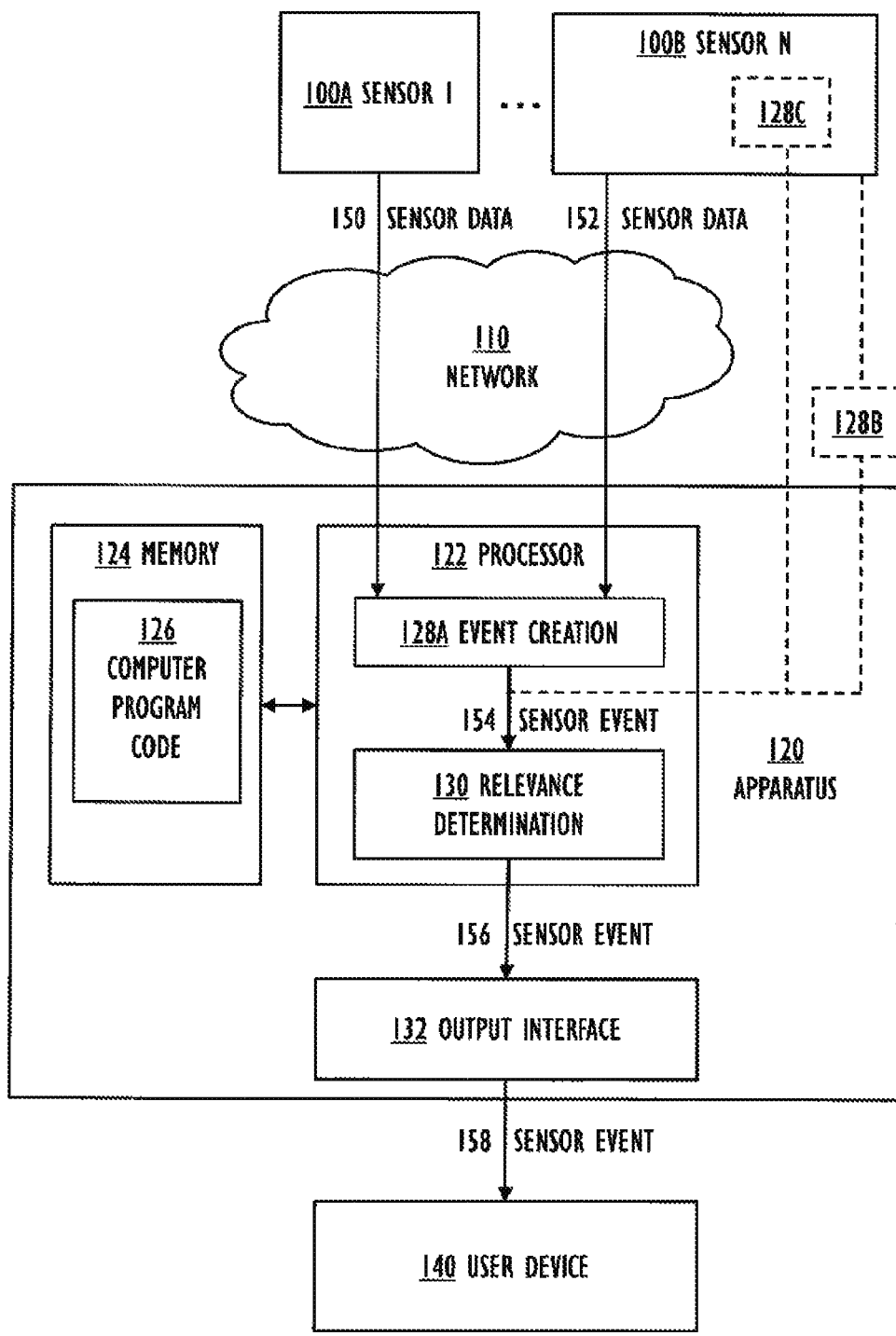

FIG. 1 illustrates example embodiments of an apparatus 120. The apparatus 120 comprises an output interface 132, one or more processors 122, and one or more memories 124 including computer program code 126.

In an example embodiment, the term 'processor' 122 refers to a physical device that is capable of processing data in a computer or other digital electronic device according to the computer program code 126. Depending on the processing power needed, the apparatus 120 may comprise several processors 122 such as parallel processors or one or more multicore processors. A non-exhaustive list of implementation techniques for the processor 122 includes, but is not limited to: logic components, standard integrated circuits, application-specific integrated circuits (ASIC), system-on-a-chip (SoC), application-specific standard products (ASSP), microprocessors, digital signal processors, special-purpose computer chips, and field-programmable gate arrays (FPGA).

In an example embodiment, the term 'memory' 124 refers to a physical device that is capable of storing the computer program code 126 and data on a temporary or permanent basis for use in a computer or other digital electronic device. In an example embodiment, the term 'memory' refers to working memory (also known as primary storage, main memory or internal storage) directly accessible to the processor 122. In an example embodiment, the working memory may be implemented as a random-access memory (RAM), such as a dynamic RAM, DRAM.

The one or more memories 124 and the computer program code 126 are configured to, with the one or more processors 122, cause the apparatus 120 to obtain a sensor event 154 created on the basis of sensor data 150, 152 generated by one or more sensors 100A, 100B. The number of the sensors 100A, 1008 may vary from 1 to N, wherein N is any positive integer greater than one.

As shown in FIG. 1, the sensor event 154 may be generated in an event creation module 128A, 128B, 128C. The event creation module 128A may be in the apparatus 120, or the event creation module 128B may be in another apparatus external to the apparatus 120, or the event creation module 128C may be in the sensor 1008. Naturally, the responsibility for the creation of the sensor event 154 on the basis of the sensor data 150, 152 may be divided between at least two of the modules 128A, 128B, 128C.

Furthermore, the one or more memories 124 and the computer program code 126 are configured to, with the one or more processors 122, cause the apparatus 120 to determine relevance of the sensor event 154, and if the relevance of the sensor event 154 fulfils a predetermined relevance condition, output, with the output interface 132, the sensor event 156, 158 according to its determined relevance. The 'relevance' may refer to a 'priority' or 'rank' of the sensor event 154. In an example embodiment, the 'relevance' may be defined as follows: the sensor event 154 is relevant to a task if it increases the likelihood of accomplishing the goal, which is implied by the task. In an example embodiment, the sensor event 154 may relate to transport, and, consequently, the sensor event 154 is relevant to the transport if it increases the likelihood of accomplishing the goal of timely and unharmed delivery, for example.

In the example embodiment of FIG. 1, the output interface 132 is configured to transmit the sensor event 158 to a user device 140.

Figure 2:
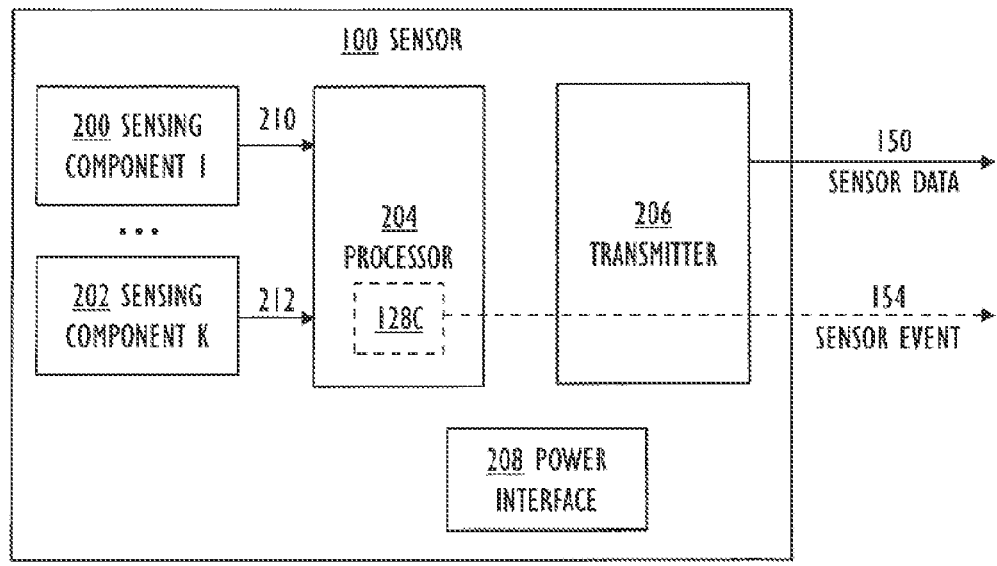
FIGS. 2 and 3 illustrate example embodiments of a sensor.
Figure 3:
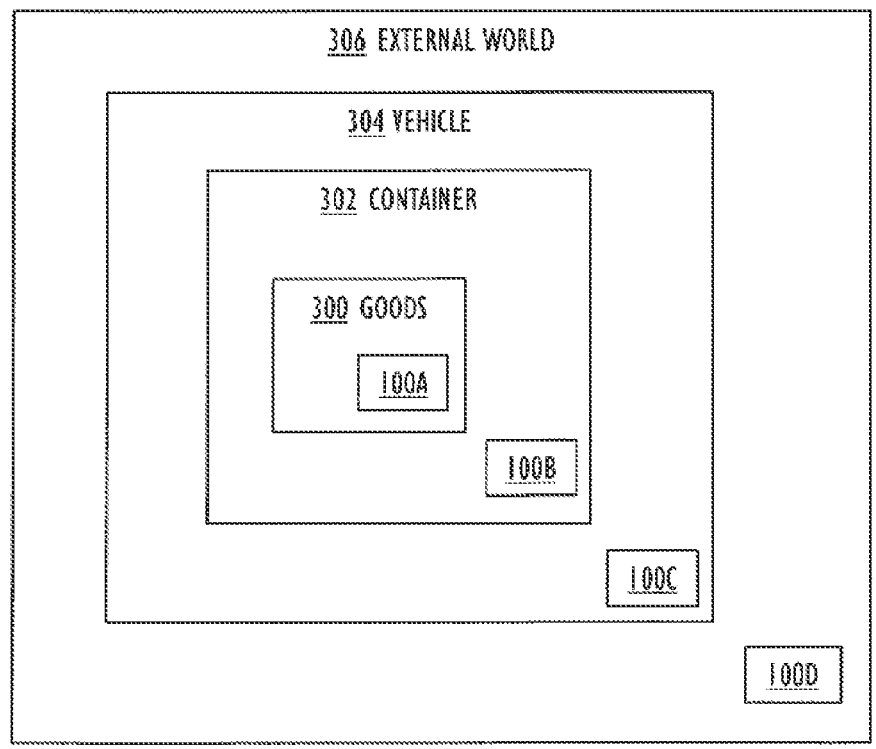

FIGS. 2 and 3 illustrate example embodiments of the sensor 100.

The sensor 100 may comprise 1 to K sensing components 200, 202, wherein K is any positive integer greater than one.

In an example embodiment, the sensing component 200, 202 may be a converter that measures a physical quantity and converts it into an electrical signal. Such physical quantities may relate to temperature, humidity, speed, acceleration, or orientation, for example.

In an example embodiment, the sensing component may 200, 202 also receive some external data and pass it on, or generate some further data on the basis of the external data. The external data may relate to positioning, for example.

In an example embodiment, the external data includes signals transmitted by satellites of a global navigation satellite system (GNSS), and/or location coordinates.

In an example embodiment, the external data includes signals relating to the Automatic Identification System (AIS), which is an automatic tracking system used on ships for identifying and locating vessels.

Furthermore, the sensor 100 comprises a transmitter 206 transmitting either the sensor data 150 or the sensor event 154. In an example embodiment, the transmitter 206 is a radio transmitter, or a radio transceiver.

In an example embodiment, the transmitter 206 is a short range radio transceiver, including, but not limited to, Bluetooth, Bluetooth LE (Low Energy), Wi-Fi, WLAN (Wireless Local Area Network) based on IEEE (Institute of Electrical and Electronics Engineers) 802.11 standard or its evolution versions (IEEE 802.11ac etc.), for example.

In an example embodiment, the transmitter 206 is a radio transceiver interoperable with various wireless standard/non-standard/proprietary communication networks such as any mobile phone network, regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), and other radio systems (in their present forms and/or in their evolution forms).

In an example embodiment, the communication network supports the use of subscriber identity modules (SIM), which may be an integrated circuit storing subscriber data, which is network-specific information used to authenticate and identify subscribers on the cellular network. The subscriber identity module may be embedded into a removable SIM card. Consequently, the sensor 100 may include the SIM card (and a SIM card reader).

In an example embodiment, the sensor 100 may include a wired data interface, such as an Ethernet interface to a fixed data network, which enables the transmission of the sensor data 150 and/or sensor events 154 through the wired connection.

The transmitter 206 of the sensor 100 enables that sensor data 150 and/or sensor events 154 may be obtained from far away, from different cities, countries or even continents.

In an example embodiment, the sensor 100 may comprise a processor 204 processing the sensor information 210, 212.

In an example embodiment, the sensor 100 comprises the earlier mentioned event creation module 128C, and it may either be in the processor 204 as shown, or, alternatively, in the sensing component 200, 202.

In an example embodiment, the processor 204 is a part of a microcontroller. In a further example embodiment, even the transmitter 206 is a part of the microcontroller chip.

In an example embodiment, the sensor 206 may comprise a power interface 208 to receive electrical energy for the operation. The power interface 208 couples the sensor 100 to an internal or external power source, such as an accumulator, battery, or mains electricity. If mains electricity is used, the sensor 100 may further comprise a transformer. In Finland, for example, the transformer may transform an alternating current with 230 Volts input voltage into lower output voltage of 3 Volts, for example.

As shown in FIG. 3, the placement of the sensor 100A, 100B, 100C, 100D may vary.

In an example embodiment, the sensor 100A is attached to transport goods 300. The term 'goods' 300 comprises tangible property (commodities, such as raw materials, products, and parts, for example.

In an example embodiment, the sensor 100B is attached to a (shipping) container 302 used for shipment, storage and handling of the transport goods 300.

In an example embodiment, the sensor 100C is attached to a vehicle 304 used for transporting the transport goods 300. The term 'vehicle' 304 comprises cars, trucks, buses, motorcycles, trains, ships, boats and aircraft.

In an example embodiment, the sensor 100D is a part of the external world 306, meaning that it is does not belong to the goods 300, container 302 or the vehicle 304. The external world 306 comprises, but is not limited to: roads, railways, railway stations, waterways (such as rivers, lakes, seas, oceans, and canals), ports, harbours, airways, airports, warehouses, loading docks, borders, navigation systems, weather stations, weather forecast services.

Figure 4:
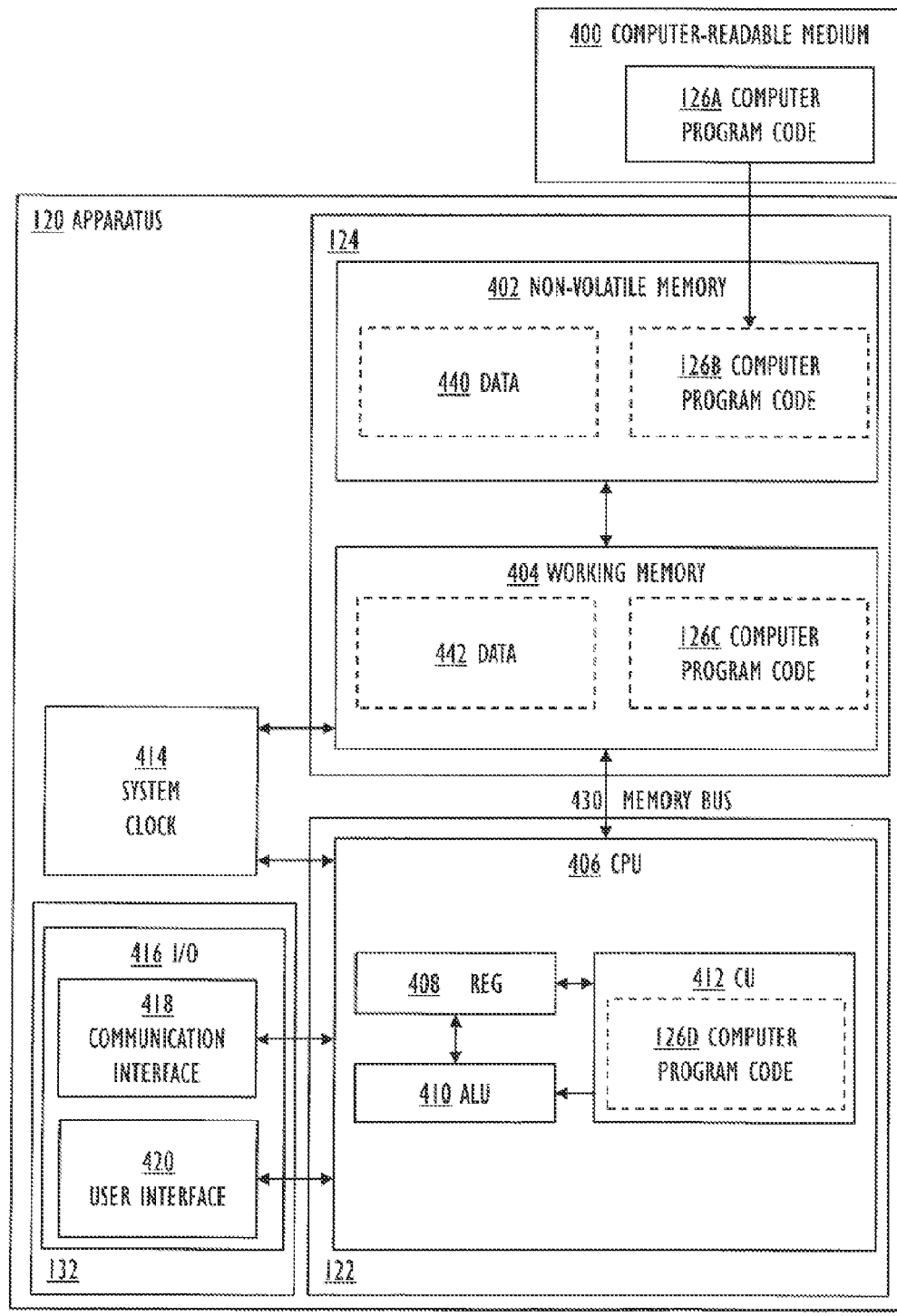
FIG. 4 illustrates further example embodiments of the apparatus.

FIG. 4 illustrates further example embodiments of the apparatus 120.

In an example embodiment, the apparatus 120 is any computing resource capable of implementing the relevance determination 130 and output 132 of the sensor event 154 such as a computer, a server computer, a cluster of computers, a computing cloud, a centralized computing resource, or a distributed computing resource.

In an example embodiment, the apparatus 120 is the server part of the client-server computing model that acts as distributed application which partitions tasks or workloads between the provider of a resource or service, called the server 120, and the service requester, called the client 140. The apparatus 120 is a host that is running one or more server programs which share their resources with clients 140. The apparatus 120 may also operate according to the cloud computing model implementing the network-based service, which appears to be provided by real hardware, but is in fact provided by virtual hardware, simulated by software running on one or more real computers. Naturally, besides these example embodiments of the apparatus 120, other feasible computing architectures may be utilized as well to implement the hardware and software of the apparatus 120. Consequently, besides operating according to the client/server architecture, push technology may be utilized as well. In push technology, the request for a transaction is initiated by the apparatus 120, whereas with the pull technology the request for the information is initiated by the user device 140 (as in the client-server model).

In an example embodiment, the apparatus 120 may include an electronic digital computer, which may comprise a non-volatile memory 402 and a working memory 404 as the memory 124, a central processing unit (CPU) 406 as the processor 122, a system clock 414 and an input/output 416 including a user interface 420 and a data communication interface 418 as the output interface 132. Naturally, the computer may comprise a number of other peripheral devices, not illustrated here for the sake of clarity. Also, the architecture of FIG. 4 is just one example embodiment as other feasible computing architectures may be utilized as well to implement the hardware and software of the apparatus 120. It is also to be noted that the architecture of FIG. 4 may be applied as well, changing those things which need to be changed, to the implementation of the user device 140 as a computer, laptop computer, tablet computer, mobile phone, or smartphone, for example.

In an example embodiment, the system clock 414 constantly generates a stream of electrical pulses, which cause the various transferring operations within the computer to take place in an orderly manner and with specific timing.

In an example embodiment, the processor 122 may be implemented as a microprocessor implementing functions of a central processing unit (CPU) 406 on an integrated circuit. The CPU 406 is a logic machine executing the computer program code 126D. The computer program code 126D may be coded as a computer program using a programming language, which may be a high-level programming language, such as C, C++, or Java, or a low-level programming language, such as a machine language, or an assembler. There are many ways to structure the computer program code 126A, 126B, 126C, 126D. In an example embodiment, the operations of the computer program code 126A, 126B, 126C, 126D may be divided into functional modules, subroutines, methods, classes, objects, applets, macros, etc., depending on the software design methodology and the programming language used. In modern programming environments, there are software libraries, i.e. compilations of ready-made functions, which may be utilized by the computer program code 126A, 126B, 126C, 126D for performing a wide variety of standard operations.

The CPU 406 may comprise a set of registers 408, an arithmetic logic unit (ALU) 410, and a control unit (CU) 412. The control unit 412 is controlled by the computer program code 126D transferred to the CPU 406 from the working memory 404. The working memory 404 is directly or indirectly connected to the CPU 406 via a memory bus 430 including two buses: an address bus and a data bus. The CPU 406 sends a memory address indicating the desired location of data 442 or computer program code 126C through the address bus, whereupon the CPU 406 reads or writes the data itself from/to the working memory 404 using the data bus.

The control unit 412 may contain a number of microinstructions for basic operations. The implementation of the microinstructions may vary, depending on the CPU design. The microprocessor 122 may also have an operating system (such as a general-purpose operating system), which may provide the computer program code 126D with system services. During running of the computer program code 126D, the computer program code 126C or a part of it are transferred via the memory bus 430 from the working memory 404 into the control unit 412, wherein usually a portion of the computer program code 126D resides and controls the operation.

In an example embodiment, the non-volatile memory 402 retains the stored information even when not powered. Examples of non-volatile memory include read-only memory (ROM), flash memory, magnetic computer storage devices such as hard disk drives, and optical discs. As is shown in FIG. 4, the non-volatile memory 402 may store both data 440 and the computer program code 126B.

An example embodiment, illustrated in FIG. 4, provides a computer-readable medium 400 comprising the computer program code 126A. Said computer program code 126A, when executed on the apparatus 120, causes the apparatus 120 to perform the operations required to implement the described example embodiments. In an example embodiment, the computer program code 126A may be in source code form, object code form, or in some intermediate form. The computer-readable medium may comprise at least the following: any entity or device capable of carrying the computer program code 126A to the apparatus 120, a record medium, a computer memory, a read-only memory, an electrical carrier signal, a telecommunications signal, and a software distribution medium. In some jurisdictions, depending on the legislation and the patent practice, the computer-readable medium 400 may not be the telecommunications signal. In an example embodiment, the computer-readable medium 400 may be a non-transitory computer readable storage medium.

Figure 5:
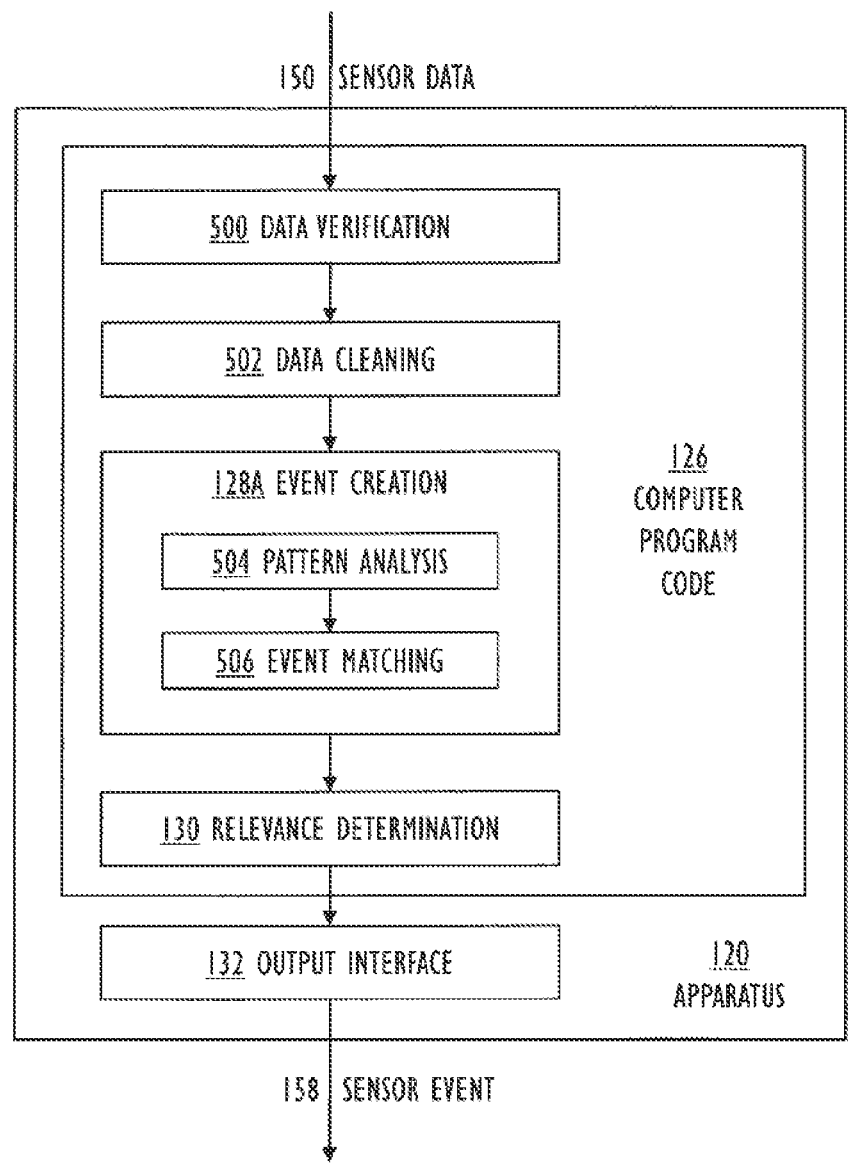
FIG. 5 illustrates example embodiments of sensor data processing.

FIG. 5 illustrates example embodiments of sensor data 150 processing.

In an example embodiment, a data verification module 500 checks the sensor data 150 for accuracy and inconsistencies.

In an example embodiment, a data cleaning module 502 detects and corrects (by replacing, modifying or deleting) corrupt, incomplete, incorrect, inaccurate, irrelevant etc. sensor data 150.

These two example embodiments may be utilized to remove inconsistencies caused by defect sensors 100, errors in the transmission, or by use of different data formats, for example.

In an example embodiment, the event creation module 128A performs pattern analysis 504 and event matching. In pattern analysis, various patterns may be recognized among the sensor data 150, whereupon labels may be given or classification performed. The event matching aims at recognizing meaningful events from the sensor data 150. For various types of events, there may be templates, and a suitable template may be chosen and filled with the sensor data 150, possibly aided by labels and/or classes obtained from the pattern analysis 504, thereby generating the sensor events 154.

Figure 6:
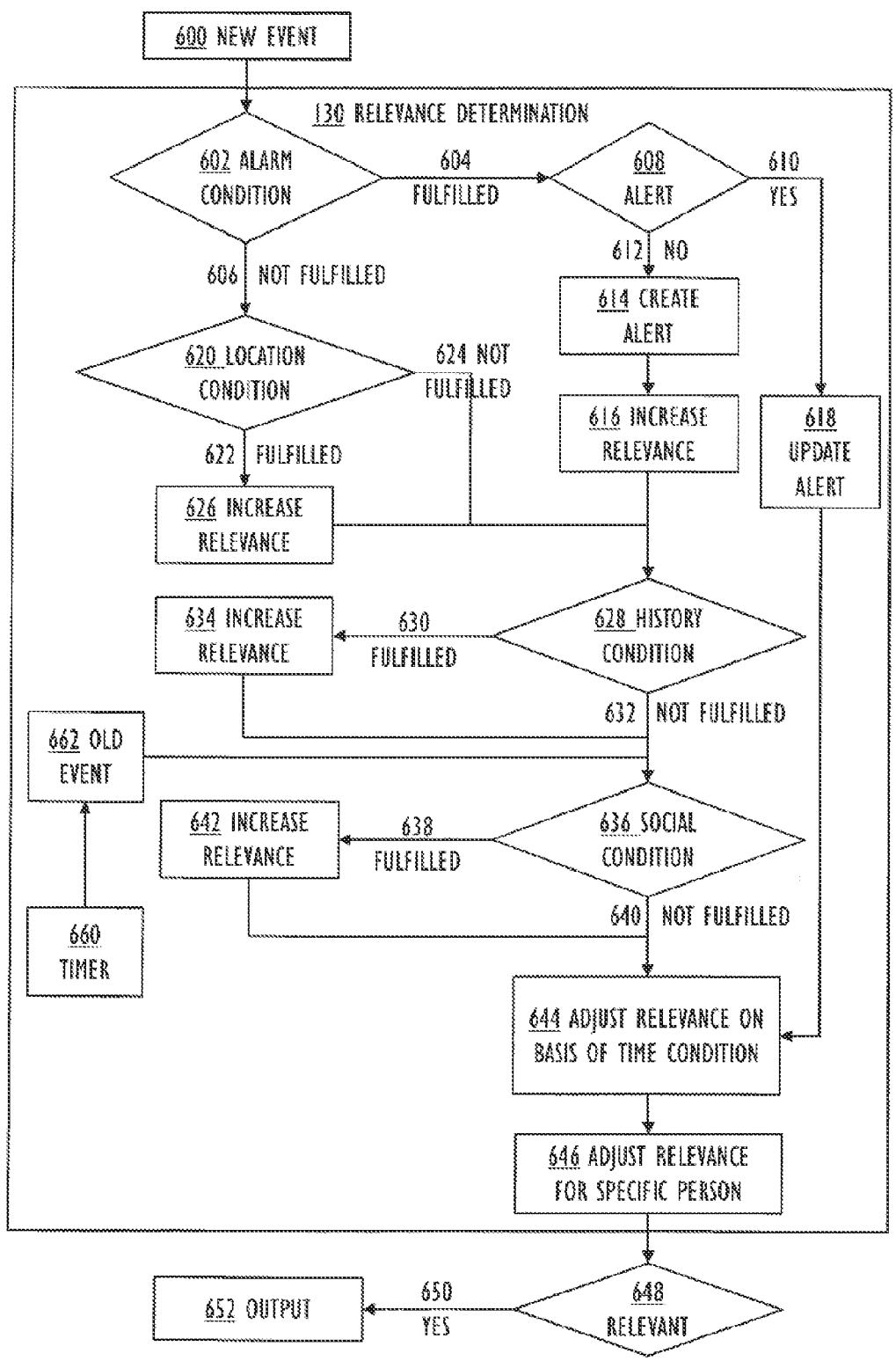
FIG. 6 is a flowchart illustrating example embodiments of relevance determination.

FIG. 6 is a flowchart illustrating example embodiments of the relevance determination 130.

As was explained earlier, the apparatus 120 first obtains a sensor event 600, 154 created on the basis of sensor data 150, 152 generated by one or more sensors 100A, 1008, whereupon the relevance of the sensor event 600, 154 is determined 130. Finally, a check 648 is made: if the relevance of the sensor event 600, 154 fulfils 650 a predetermined relevance condition, the sensor event 600, 154 is output 652 according to its determined relevance with the output interface 132. In this way, the telecommunications capacity is saved as only meaningful, relevant sensor events 600, 154 need to be transmitted to the user device 140, or, if outputted locally with the user interface 420, the user is relieved of the burden to inspect irrelevant sensor events 600, 154.

In an example embodiment, the one or more memories 124 and the computer program code 126 are further configured to, with the one or more processors 122, cause the apparatus 120 further to determine the relevance of the sensor event 600, 154 by the following: if the sensor event 600, 154 fulfils 604 a predetermined alarm condition 602, check 608 if an alert already exists, and if the alert does not yet exist 612, create 614 an alert and increase 616 the relevance of the sensor event, or else if the alert already exists 610, update the alert 618. This means that the sensor event 600, 154 may not be especially relevant if an alert already exists. It may also be beneficial to just update the alert status, and this alert is then output 658.

In an example embodiment, the sensor event 600, 154 comprises one or more data points generated by the one or more sensors 100A, 1008, and the sensor event 600, 154 fulfils 604 the predetermined alarm condition 602 if at least one data point deviates from its predetermined alarm threshold value. The deviation may be realized by the data point exceeding the predetermined alarm condition, or by the data point going below the predetermined alarm condition.

The data point may refer to a single measurement, such as a temperature, humidity, speed, acceleration, orientation, or location coordinates, for example. For example, let us suppose that the sensor event 600, 154 is obtained by a sensor 1008 placed in a container 302 filled with frozen transport goods 300. The alarm threshold value may be −21 degrees Celsius. Now, if the sensor event is −18 degrees Celsius, for example, then the data point goes below the predetermined alarm condition, and an alert is created 614. Naturally, more than one data points may each be compared to its individual predetermined alarm condition, and the alert may only be created 614 provided that all the requirements set for the alarm condition are met.

In an example embodiment, the sensor event 600, 154 comprises one or more data points generated by the one or more sensors 100A, 1008, and the sensor event 600, 154 fulfils the predetermined alarm condition if a trend detected on the basis of the sensor event 600, 154 and at least one previous sensor event shows that at least one data point will deviate from its predetermined alarm threshold value while following the trend. Such trend analysis attempts to spot the trend (or pattern) in order to predict a future event. Let us suppose that the previous sensor event showed that the temperature in the container 302 was −24 degrees Celsius, but the newest sensor event 600, 154 gives the temperature as −22 degrees Celsius. Now, even though the newest sensor event 600, 154 is still over the predetermined alarm condition of −21 degrees Celsius, it may be suspected that, if the trend continues, the temperature will drop below the predetermined alarm condition, and a premature alert may be raised. In this way, dire consequences may be avoided if an action may be taken before the actual alert.

In an example embodiment, the one or more memories 124 and the computer program code 126 are further configured to, with the one or more processors 122, cause the apparatus 120 further to determine the relevance of the sensor event 600, 154 by the following: if the sensor event 600, 154 fulfils 622 a predetermined location condition 620, increase 626 the relevance of the sensor event 600, 154. The predetermined location condition may relate to a very specific location, such as a certain part of a road, a certain part of a railway, a certain railway station, a certain location in a waterway (such as a certain river, lake, sea, ocean, or canal), a certain port, a certain harbour, a certain location in an airway, a certain airport, a certain warehouse, a certain loading dock, a certain border (between countries), for example. The predetermined location condition 620 may be entered from the alarm condition 606 if the alarm condition is not fulfilled 606. If the predetermined location condition 620 is not fulfilled 624, the next check may be entered.

In an example embodiment, the sensor event 600, 154 comprises a location data point generated by the one or more sensors 100A, 1008, and the sensor event 600, 154 fulfils 622 the predetermined location condition 620 if the location data point is the same location within a predetermined location margin as the predetermined location condition. The predetermined location margin may be determined as a deviation from the predetermined location condition, and it may be expressed as an absolute measure of length, in meters, kilometers, miles, or the like.

In an example embodiment, the sensor event 600, 154 comprises a location data point generated by the one or more sensors 100A, 1008, and the sensor event 600, 154 fulfils 622 the predetermined location condition 620 if in the location pointed to by the location data point there exists at least a predetermined number of other sensor events fulfilling predetermined alarm conditions and/or having alerts. This example embodiment makes use of the bigger picture, i.e., besides analysing sensor events 600, 154 relating to a specific transport, as explained in connection with FIG. 3, also other sensor events, not directly relating to that specific transport may provide useful information. Let us suppose that the container 302 is loaded into a ship 304. If other containers loaded into the same ship 304 report too high acceleration values, caused by a storm, for example, it may be suspected that also the goods 300 in the container 302 may have been damaged.

In an example embodiment, the one or more memories 124 and the computer program code 126 are further configured to, with the one or more processors 122, cause the apparatus 120 further to determine the relevance of the sensor event 600, 154 by the following: if the sensor event 600, 154 fulfils 630 a predetermined history condition 628, increase 634 the relevance of the sensor event 600, 154. If the predetermined history condition 628 is not fulfilled 632, the next check may be entered.

In an example embodiment, the sensor event 600, 154 fulfils 630 the predetermined history condition 628 if at least one previous sensor event fulfilled a predetermined alarm condition and/or an alert was created. The history may be utilized in various ways. A certain shipping company, or even a ship, may have a bad track record, i.e., damages have happened more frequently than what is usual. Also a certain country, a specific route, or a certain loading dock, for example may have been problematic. The history makes uses of such information collected from past sensor events, for example, in order to predict possible future problems. In an example embodiment, the sensor event 600, 154 fulfils 630 the predetermined history condition 628 if the sensor event 600, 154 relates to a party, location and/or route, which fulfilled predetermined alarm conditions in the past and/or had an alert in the past.

In an example embodiment, the one or more memories 124 and the computer program code 126 are further configured to, with the one or more processors 122, cause the apparatus 120 further to determine the relevance of the sensor event 600, 154 by the following: if the sensor event 600, 154 fulfils 638 a predetermined social condition 636, increase the relevance 642 of the sensor event. If the predetermined social condition 636 is not fulfilled 640, the next check may be entered. In an example embodiment, the sensor event 600, 154 fulfils 638 the predetermined social condition 636, if the number of followers registered for the sensor event 600, 154 fulfils a predetermined follower condition, and/or if the number of comments relating to the sensor event 600, 154 fulfils a predetermined comment condition. Thus the predetermined social condition 636 causes the apparatus 120 to increase the relevance of such sensor events 600, 154 towards which various parties have shown interest. For example, a specific delivery may include such goods 300 that are very important for the recipient, and, consequently, it is beneficial for the consignor to recognize this in order to monitor the transport more closely than the usual standard is. The follower condition may relate to the number of followers in some social media, for example. The number of comments may relate to the number of comments in some social media, or number of e-mails, text messages, phone calls, or the like, for example.

In an example embodiment, the one or more memories 124 and the computer program code 126 are further configured to, with the one or more processors 122, cause the apparatus 120 further to determine the relevance of the sensor event 600, 154 by the following: adjust 644 the relevance of the sensor event 600, 154 on the basis of a time condition such that the relevance of the sensor event 600, 154 is increased, the newer the sensor event 600, 154 is, and the relevance of the sensor event 600, 154 is decreased, the older the sensor event is. As the sensor events 600, 154 may arrive from faraway places, there may considerable delays caused by the properties of the communication network 110 and possibly also by errors in the functioning of the communication network 110. Let us suppose that a sensor event 600, 154 arrives informing of high acceleration values during the shipping. However, another, later, sensor event already informs that the delivery has arrived at the destination. Consequently, the sensor event relating to the shipping is of no imminent interest and need not be informed to the user device 140. Naturally, even the old sensor event may still be stored, as the recipient may claim for damages if the goods 300 are damaged, and only then the sensor event again becomes interesting. The processing of old sensor events 662 may be continued as instructed by a timer 660: as the timer expires, the old sensor event 662 may be brought into the processing again, starting from the social condition evaluation 636, for example In an example embodiment, the one or more memories 124 and the computer program code 126 are further configured to, with the one or more processors 122, cause the apparatus 120 further to determine the relevance of the sensor event 600, 154 by the following: adjust 646 the relevance of the sensor event 600, 154 for a specific person on the basis of a responsibility condition such that the relevance of the sensor event 600, 154 for the specific person is increased, the nearer the sensor event 600, 154 is to a responsibility of the specific person, and the relevance of the sensor event 600, 154 is decreased, the farer the sensor event 600, 154 is to the responsibility of the specific person. For example, if the sensor event 600, 154 relates to shipping of specific goods 300, the owner of the goods receives the maximum responsibility score, whereas the supervisor of the owner gets a medium responsibility score, and, finally, the administrator only gets a low responsibility score.

It will be obvious to a person skilled in the art that, as technology advances, the inventive concept can be implemented in various ways. The invention and its embodiments are not limited to the example embodiments described above but may vary within the scope of the claims.

The invention claimed is:
1. An apparatus comprising:
an output interface;
one or more processors; and
the one or more memories and the computer program code configured to, with the one or more processors, cause the apparatus at least to:
obtain a sensor event created on the basis of sensor data generated by one or more Sensors;
determine relevance of the sensor event; and
if the relevance of the sensor event fulfils a predetermined relevance condition, output, with the output interface, the sensor event according to its determined relevance,
wherein the one or more memories and the computer program code are further configured to, with the one or more processors, cause the apparatus further to determine the relevance of the sensor event by the following:
adjust the relevance of the sensor event for a specific person on the basis of a responsibility condition such that the relevance of the sensor event for the specific person is increased, the nearer the sensor event is to a responsibility of the specific person, and the relevance of the sensor event is decreased, the farer the sensor event is to the responsibility of the specific person.

* * * * *